United States Patent [19]

Gutierrez et al.

[11] Patent Number: 4,943,382
[45] Date of Patent: Jul. 24, 1990

[54] LACTONE MODIFIED DISPERSANT ADDITIVES USEFUL IN OLEAGINOUS COMPOSITIONS

[75] Inventors: Antonio Gutierrez, Mercerville; Robert D. Lundberg, Bridgewater, both of N.J.

[73] Assignee: Exxon Chemical Patents Inc., Linden, N.J.

[21] Appl. No.: 178,100

[22] Filed: Apr. 6, 1988

[51] Int. Cl.$^5$ .................................. C10M 149/12
[52] U.S. Cl. .................. 252/51.5 A; 548/520; 548/546
[58] Field of Search .............. 252/51.5 A; 548/520, 548/546

[56] References Cited

U.S. PATENT DOCUMENTS

| | | | |
|---|---|---|---|
| Re. 26,330 | 1/1968 | Colfer | 208/48 |
| 3,087,936 | 4/1963 | Le Suer | 260/326.3 |
| 3,131,150 | 4/1964 | Stuart et al. | 252/34.7 |
| 3,154,560 | 10/1964 | Osuch | 260/326.3 |
| 3,169,945 | 2/1965 | Hostettler et al. | 260/104.5 |
| 3,172,892 | 3/1965 | Le Suer | 260/326.5 |
| 3,198,736 | 8/1965 | Henderson | 252/46.7 |
| 3,202,678 | 8/1965 | Stuart et al. | 260/326.5 |
| 3,215,707 | 9/1965 | Rense | 260/326.3 |
| 3,219,666 | 9/1965 | Norman et al. | 260/268 |
| 3,231,587 | 1/1966 | Rense | 260/346.8 |
| 3,269,946 | 8/1966 | Wiese | 252/32.5 |
| 3,272,743 | 9/1966 | Norman et al. | 252/32.5 |
| 3,272,746 | 9/1966 | Le Suer | 252/47.5 |
| 3,278,550 | 10/1966 | Norman et al. | 260/326.3 |
| 3,284,409 | 11/1966 | Dorer | 252/49.9 |
| 3,284,417 | 11/1966 | Hostettler et al. | 260/78.3 |
| 3,288,714 | 11/1966 | Ousch | 252/32 |
| 3,361,673 | 1/1968 | Stuart et al. | 252/51.5 |
| 3,381,022 | 4/1968 | Le Suer | 260/404.8 |
| 3,390,086 | 6/1968 | O'Halloran | 252/47.5 |
| 3,401,118 | 9/1968 | Benoit | 252/51.5 |
| 3,403,102 | 9/1968 | Le Suer | 252/49.8 |
| 3,455,827 | 7/1969 | Mehmedbasich | 252/32.7 |
| 3,522,179 | 7/1970 | Le Suer | 252/51.5 |
| 3,562,159 | 2/1971 | Mastin | 252/32.7 |
| 3,576,743 | 4/1971 | Widmer et al. | 252/51.5 |
| 3,632,510 | 1/1972 | Le Suer | 252/35 |
| 3,684,771 | 8/1972 | Braun | 260/77 |
| 3,792,061 | 2/1974 | Zecher et al. | 260/326 |
| 3,799,877 | 3/1974 | Nnadi et al. | 252/51.5 |
| 3,836,470 | 9/1974 | Miller | 252/51.5 |
| 3,836,471 | 9/1974 | Miller | 252/51.5 |
| 3,838,050 | 9/1974 | Miller | 252/56 |
| 3,838,052 | 9/1974 | Miller | 252/56 |
| 3,879,308 | 4/1975 | Miller | 252/56 |
| 3,912,764 | 10/1975 | Palmer, Jr. | 260/346.8 |
| 3,927,041 | 12/1975 | Cengel et al. | 260/346.8 |
| 3,950,341 | 4/1975 | Okamoto et al. | 260/268 |
| 4,062,786 | 12/1977 | Brois et al. | 260/51.5 R |
| 4,110,349 | 8/1978 | Cohen | 260/346 |
| 4,113,639 | 9/1978 | Lonstrup et al. | 252/51.5 |
| 4,116,875 | 9/1978 | Nnadi et al. | 252/49.6 |
| 4,116,876 | 9/1978 | Brois et al. | 252/497 |
| 4,123,373 | 10/1978 | Brois et al. | 252/48.6 |
| 4,151,173 | 4/1979 | Vogel | 260/326.5 |
| 4,182,715 | 1/1980 | Heiba et al. | 260/326.5 |
| 4,195,976 | 4/1980 | Ryer et al. | 44/63 |
| 4,234,435 | 11/1980 | Meinhardt et al. | 252/51.5 |
| 4,362,635 | 12/1982 | Dhein et al. | 252/56 |
| 4,379,914 | 4/1983 | Lundberg | 528/354 |
| 4,463,168 | 7/1984 | Lundberg | 528/355 |
| 4,502,970 | 3/1985 | Schetelich et al. | 252/32.7 |
| 4,517,104 | 5/1985 | Bloch et al. | 252/51.5 |
| 4,532,058 | 7/1985 | Chafetz | 252/51.5 |
| 4,536,547 | 8/1985 | Lundberg et al. | 525/186 |
| 4,617,138 | 10/1986 | Wollenberg | 252/51.5 |
| 4,645,515 | 2/1987 | Wollenberg | 44/63 |
| 4,647,390 | 3/1987 | Buckley et al. | 252/51.5 |
| 4,663,062 | 5/1987 | Wollenberg | 252/47.5 |
| 4,666,459 | 5/1987 | Wollenberg | 44/56 |
| 4,666,460 | 5/1987 | Wollenberg | 44/63 |
| 4,668,246 | 5/1987 | Wollenberg | 44/63 |
| 4,680,129 | 7/1987 | Plavac | 65/17 |
| 4,741,848 | 5/1988 | Koch et al. | 252/49.6 |
| 4,746,446 | 5/1988 | Wollenberg et al. | 252/51.5 A |
| 4,746,447 | 5/1988 | Wollenberg | 252/51.5 A |
| 4,747,963 | 5/1988 | Wollenberg | 252/51.5 A |
| 4,747,965 | 5/1988 | Wollenberg et al. | 252/51.5 A |
| 4,783,275 | 11/1988 | Wollenberg | 252/51.5 A |

FOREIGN PATENT DOCUMENTS 1054370 1/1967 United Kingdom .
1440219 6/1976 United Kingdom .

Primary Examiner—William R. Dixon, Jr.
Attorney, Agent, or Firm—J. B. Murray, Jr.

[57] ABSTRACT

Lactone modified adducts are made by first reacting a non-polymerizable lactone or thiolactone and then a polymerizable $C_5$–$C_9$ lactone with an aminated hydrocarbyl substituted $C_4$–$C_{10}$ monounsaturated dicarboxylic acid producing material, e.g. a polyisobutenyl succinimide, which, in turn, preferably is made by reacting a polymer of a $C_2$ to $C_{10}$ monoolefin, preferably polyisobutylene, having a molecular weight of about 700 to 5,000 with a $C_4$ to $C_{10}$ monounsaturated acid, anhydride or ester, preferably maleic anhydride, such that there are about 0.7 to 2.0 dicarboxylic acid producing moieties per molecule of said olefin polymer used in the reaction mixture, and then reacting the substituted acid, anhydride or ester with an amine. The resulting adducts are useful per se as oil soluble dispersant additives. They are also useful in fuel and lubricating oil compositions, as well as in concentrates and additive packages.

74 Claims, No Drawings

LACTONE MODIFIED DISPERSANT ADDITIVES USEFUL IN OLEAGINOUS COMPOSITIONS

RELATED U.S. APPLICATIONS

This application is related to the following applications filed by the inventors herein: Ser. Nos. 916,218; 916,914; 916,913; 916,287 916,908, 916,303; and 916,217. All of the above applications were filed on Oct. 7, 1986 and all of these related applications are expressly incorporated herein by reference in their entirety.

BACKGROUND OF THE INVENTION

1. Field of the Invention

This invention relates to oil soluble dispersant and/or detergent additives useful in fuel and lubricating oil compositions, including concentrates containing said additives, and methods for their manufacture and use. The dispersant additives are adducts of dicarboxylic acids, anhydrides, esters, etc., which have been substituted with a high molecular weight hydrocarbon group, neutralized by reaction with a polyamine, modified by reaction with a non-polymerizable lactone, and then further modified by reaction with a polymerizable $C_5$–$C_9$ lactone. The high molecular weight hydrocarbon group has a number average molecular weight ($M_n$) of about 700 to about 5,000. The additives will have a ratio (functionality) of about 0.70 to about 2.0 dicarboxylic acid producing moieties for each equivalent weight of the high molecular weight hydrocarbon therein.

It is known that polymers of 6 to 10 membered lactones such as valerolactone or epsilon-caprolactone, hereinafter E-caprolactone, can be prepared by reacting the lactone monomer with a hydroxyl or amine initiator. When reacting E-caprolactone, for example, the polymerization reaction may be illustrated by the following equations:

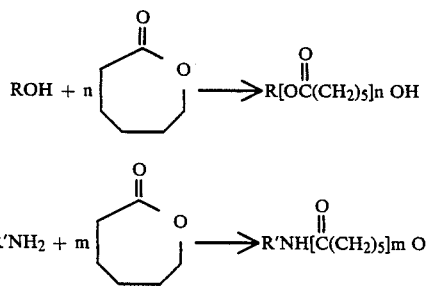

Eq. 1
Eq. 2

The reactions are known to be catalyzed by various esterification catalysts such as stannous octanoate, and a variety of different molecular weight products are feasible depending upon the ratio of lactone to initiator. Molecular weights on the order of from a few hundred up to about 5,000 are reproducably achievable.

Caprolactone can also be polymerized to a very high molecular weight, e.g., on the order of 100,000 or more. Typically such high molecular weight polymers do not employ initiators and preservation of functionality is not a requirement.

It is also known to react a lactone such as E-caprolactone with a diamine wherein one of the diamine groups is a tertiary amine and the other amine group is a primary or secondary amine to form a polycaprolactone polymer having a tertiary amine group at one end and a primary hydroxyl group at the other end. The polycaprolactone polymer would be used to neutralize polymeric acids.

The use of non-polymerizable lactones, such as butyrolactones and acyl substituted lactones, to modify alkenyl or alkyl succinimide dispersant additives is also known.

It has now been found that oil soluble dispersant additives, useful in fuel and lubricating oil compositions, including concentrates containing the additives, can be prepared by first reacting a non-polymerizable lactone with a known class of aminated oil soluble dispersants, namely: dicarboxylic acids, anhydrides, esters, etc. that have been substituted with a high molecular weight hydrocarbon group, followed by reaction with and polymerization of a 6 to 10 membered lactone using as the ring opening and polymerization initiator those lactone-reactive functions contained within the non-polymerizable lactone-oil soluble dispersant reaction product. Typical examples of such initiators are the products formed by reacting non-polymerizable lactones such as butyrolactone, together with polyalkylene succinimides wherein the polyalkylene moiety has a number average molecular weight of about 700 to about 5,000 and wherein the ratio (functionality) of succinic acid producing moieties to each equivalent weight of the polyalkylene moiety is from about 0.70 to about 2.0.

While there are a number of prior art disclosures relating to polyalkenyl succinimide-type dispersants, to non-polymerizable lactone modified polyalkenyl succidimide-type dispersants, and to lactone polymerization reactions, in general, little or not prior art of direct pertinence appears to have surfaced in regard to the present dispersants. Exemplary of the patent literature which relates to lactone polymerization processes and/or to oil soluble dispersant additives are the following U.S. Pat. No. 4,617,138 discloses polyamino alkenyl or alkyl succinimides which have been modified by treatment with a non-polymerizable lactone to yield polyamino alkenyl or alkyl succinimides wherein one or more of the basic nitrogens of the polyamino moiety is substituted with a hydrocarbylcarbonyl alkylene group. The modified succinimides are disclosed as being useful as dispersants in lubricating oils, gasolines, marine crankcase oils and hydraulic oils.

U.S. Pat. No. 4,182,715 discloses the reaction of gamma-alkyl-gamma butyrolactones having an alkyl substituent of at least 16 carbon atoms in length with amines or polyalkylene polyamines. The products of this reaction are disclosed as multifunctional agents in lubricants, fuels, coolants and other organic fluids.

U.S. Pat. No. 4,645,515 discloses polyamine alkenyl or alkyl succinimides which have been modified by treatment with a lactone to yield polyamino alkenyl or alkyl succinimides wherein one or more of the basic nitrogens of the polyamino moiety is substituted with a hydroxyalkylene carbonyl group. The additives so disclosed are useful as dispersants in lubricating oils, gasolines, marine crank case oils and hydraulic oils.

U.S. Pat. No. 4,647,390 relates to additives which are useful as dispersants and detergents in lubricating oils and fuels. The additives are polyamino alkenyl or alkyl succinimides wherein one or more of the amino nitrogens of the succinimide is substituted with

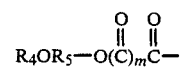

wherein $R_4$ is hydrocarbyl of from 1 to 30 carbon atoms; $R_5$ is hydrocarbyl of from 2 to 30 carbon atoms or —$R_6$—($OR_6$)p—, wherein $R_6$ is alkylene of 2 to 5 carbon atoms and p is an integer from 1 to 100; and m is an integer of from 0 to 1.

U.S. Pat. No. 4,663,062 discloses polyaminoalkenyl or alkyl succinimides which have been modified by treatment with a compound of the formula:

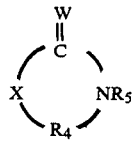

wherein W is oxygen or sulfur; X is oxygen or sulfur; $R_4$ is an alkylene group of from 2 to 3 carbon atoms or an alkylene group of from 2 to 3 carbon atoms substituted with from 1 to 3 alkyl groups of from 1 to 2 carbon atoms each; and $R_5$ is hydrogen or alkyl of from 1 to 20 carbon atoms. The modified polyamino alkenyl or alkyl succinimides possess dispersancy and detergency in lubricating oils and in fuels. Similar disclosures are contained in U.S. Pat. Nos. 4,666,459 and 4,666,460.

U.S. Pat. No. 4,668,246 relates to polyamino alkenyl or alkyl succinimides which have been modified by treatment with a lactone to yield polyamino alkenyl or alkyl succinimides wherein one or more of the basic nitrogens of the polyamino moiety is substituted with a hydrocarbylcarbonylalkylene group. The additives are useful as dispersants in lubricating oils, gasolines, marine crank case oils and hydraulic oils.

U.S. Pat. No. 4,680,129 relates to polyamino alkenyl or alkyl succinimides wherein one or more of the nitrogens of the polyamino moiety is substituted with:

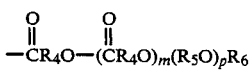

wherein $R_4$ is alkylene of from 1 to 6 carbon atoms; m is an integer of from 0 to 2; $R_5$ is alkylene of from 2 to 5 carbon atoms; p is an integer of rom 1 to 100; $R_6$ is selected from the group consisting of hydrogen and hydrocarbyl of from 1 to 30 carbon atoms; and with the proviso that if m is one or two then $R_6$ is hydrogen. The disclosed materials are additives which are useful as dispersants in marine crankcase oils, hydraulic oils, and lubricating oils. The examiner's attention is directed to the disclosure at column 9 where in Formula Ia there is shown the product formed by reaction of excess glycolic acid.

U.S. Pat. No. 4,362,635 discloses synthetic ester oils which are esterification products of monoalcohols and dicarboxylic acids or of polyhydric alcohols and monocarboxylic acids respectively, containing 5 to 45% by weight of units of hydroxycarboxylic acids obtained from aliphatic alcohols, aliphatic, cycolaliphatic or aromatic carboxylic acids, and lactones of aliphatic $C_5$–$C_{12}$ hydroxycarboxylic acids. The synthetic ester oils are suitable for the preparation of lubricants and lubricant compositions.

U.S. Pat. No. 3,202,678 discloses as oil additives, N-polyamine substituted alkenyl succinimides, wherein the alkenyl radical is obtained by polymerizing a $C_2$–$C_5$ olefin to form a hydrocarbon having a molecular weight ranging from about 400 to about 3000. The number of dicarboxylic acid producing moieties per hydrocarbon radical in the succinimides is not disclosed, but the mole ratio of polyolefin to maleic anhydride used to obtain the alkenyl succinimides is from 1:1 to 1:10.

U.S. Pat. No. 3,219,666 discloses as dispersing agents in lubricants, derivatives of polyalkenyl succinic acids and nitrogen compounds, including polyamines. The preferred molecular weight of the
polyalkenyl moieties is 750–5,000.

U.S. Pat. No. 4,234,435 discloses as oil additives, polyalkylene substituted dicarboxylic acids derived from polyalkylenes having a $M_n$ of 1300 to 5,000 and containing at least 1.3 dicarboxylic acid groups per polyalkylene. In Example 34 of that patent, a polyisobutene-substituted succinic acylating agent is reacted with caprolactam in the presence of mineral oil and sodium hydroxide.

U.S. Pat. No. 3,381,022 relates to ester derivatives of substantially saturated polymerized olefin-substituted succinic acid wherein the polymerized olefin substituent contains at least about 50 aliphatic carbon atoms and as a molecular weight of about 700 to 5000. The esters include the acidic esters, diesters, and metal salt esters wherein the ester moiety is derived from monohydric and polyhydric alcohols, phenols and naphthols. The ester derivatives are useful as additives in lubricating compositions, fuels, hydrocarbon oils and power transmission fluids. A related application, i.e., U.S. Pat. No. 3,522,179, relates to lubricating compositions comprising a major amount of a lubricating oil and a minor proportion of an ester derivative of a hydrocarbon-substituted succinic acid sufficient to improve the detergency of the lubricating composition. The ester derivatives are similar to those described in U.S. Pat. No. 3,381,022 and contain at least about 50 aliphatic carbon atoms. The hydrocarbon substituent may be derived from a polymerized lower monoolefin having a molecular weight of from about 700 to about 5,000.

U.S. Pat. No. 4,502,970 discloses lubricating oil compositions useful in both gasoline engines and diesel engines. The compositions contain a polyisobutenyl succinicimide as a supplemental dispersant-detergent in combination with another conventional dispersant. The polyisobutenyl group has a $M_n$ of about 700–5,000.

U.S. Pat. No. 4,379,914 and its continuation-in-part (U.S. Pat. No. 4,463,168) disclose the preparation of polycaprolactone polymers by reacting E-caprolactone with a diamine wherein one of the amine groups of the diamine is a tertiary amine and the other is a primary or secondary amine. The polycaprolactone polymers are disclosed as being useful for neutralizing certain sulfonic acid-containing polymers to form amine-neutralized sulfonated derivatives.

U.S Pat. No. 3,169,945 discloses the preparation of lactone polyesters which are useful as plasticizers and as intermediates for preparing elastomers and foams. The polyesters can be prepared by reacting a lactone such as E-caprolactone with an initiator such as an alcohol, amine or amino alcohol.

U.S. Pat. No. 4,532,058 discloses as a motor oil dispersant, a spirolactone condensation product formed by heating alkenyl succinic anhydrides in the presence of a basic catalyst, and then heating the resulting bicyclic spirodilactone condensation product with a polyamine or polyamine alcohol. It should be emphasized that this patent describes the intermolecular decaboxylation of an alkenyl succinic anhydride at elevated temperatures to form a condensation product and carbon dioxide as a by-product. This prior art is not concerned with polymerizable lactones which are utilized as the final modifying component for the dispersant additives of the instant invention.

U.S. Pat. Nos. 4,113,639 and 4,116,876 disclose an example of alkenyl succinic anhydride having a molecular weight of the alkenyl group of 1,300 and a Saponification Number of 103 (about 1.3 succinic anhydride units per hydrocarbon molecule). This alkenyl succinic anhydride may be reacted with polyamine and then boric acid (U.S. Pat. Nos. 4,113,639), or may be reacted with an amino alcohol to form an oxazoline (4,116,876) which is then borated by reaction with boric acid.

U.S. Pat. No. 4,062,786, in Example 13, shows a polyisobutenyl succinic anhydride of molecular weight of about 1300 and a Saponification Number of about 100 (about 1.25 succinic anhydride units per alkenyl group).

U.S. Pat. No. 4,123,373, in Example 3, shows a polyisobutenyl succinic anhydride of about 1,400 molecular weight having a Saponification Number of 80 (about 1.07 succinic anhydride units per polyisobutylene units). U.S. Pat. No. 4,536,547 relates to polymerized complexes of a neutralized ionic polymer and a polycaprolactone polymer. The polymer complexes are useful as adhesive agents, thermoplastic elastomers and the like. This patent illustrates the reaction of E-caprolactone with a diamine to form an adduct of the diamine and polycaprolactone.

Additional exemplary prior art disclosures which are expressly incorporated herein by reference in their entirely are U.S. Pat. Nos: 3,087,936; 3,131,150; 3,154,560; 3,172,892; 3,198,736; 3,215,707; 3,231,587; 3,269,946; 3,272,743; 3,272,746; 3,278,550; 3,284,409; 3,284,417; 3,288,714; 3,361,673; 3,390,086; 3,401,118; 3,403,102; 3,455,827; 3,562,159; 3,576,743; 3,632,510; 3,684,771; 3,792,061; 3,799,877; 3,836,470; 3,836,471; 3,838,050; 3,838,052; 3,879,308; 3,912,764; 3,927,041; 3,950,341; 4,110,349; 4,113,639; 4,116,875; 4,151,173; 4,195,976; 4,517,104; and Re. 26,330.

SUMMARY OF THE INVENTION

It is a principal object of this invention to provide a novel class of lactone adduct dispersants.

Another object is to provide a process for preparing a novel class of dispersants from (a) nonpolymerizable lactones, (b) polymerizable $C_5$–$C_9$ lactones, and (c) hydrocarbyl substituted dicarboxylic acids, anhydrides, esters, etc. which contain lactone-reactive amine functionality A further object is to provide lubricant compositions and concentrates containing the novel lactone adducts of this invention.

Yet another object is to provide a novel class of oil soluble dispersants from polyalkylene substituted acylating agents which have at least one lactone-reactive amino group in their structure.

Still another object is to provide poly ($C_5$–$C_9$ lactone) adducts from derivatives of polyalkylene substituted succinic acylating agents which contain at least one lactone-reactive amino group and which have been pre-reacted with non-polymerizable lactone, as well as lubricant compositions and concentrates containing such adducts.

Still another object is to provide metal complexes and other post-treated derivatives, e.g., borated derivatives, of the novel lactone modified dispersant additives of this invention, as well as lubricant compositions and concentrates containing such post-treated derivatives.

The manner in which these and other objects can be achieved will be apparent from the detailed description of the invention which appears hereinbelow.

In one aspect of this invention, one or more of the above objects can be achieved by initiating the polymerization of a $C_5$–$C_9$ lactone by means of a functional group contained in a polyolefin substituted dicarboxylic acylating agent that has been pre-reacted with a non-polymerizable lactone, wherein the polyolefin has a number average molecular weight of about 700 to about 5,000, wherein the acylating agent has been neutralized with a polyfunctional amine, and wherein the polyolefin substituted, neutralized acylating agent contains from about 0.70 to about 2.0 dicarboxylic acid producing moieties, preferably acid anhydride moieties, per equivalent weight of polyolefin.

In another aspect, one or more of the objects of this invention can be achieved by first heating a non-polymerizable lactone, such as butyrolactone, at a temperature of at least about 80° C., and preferably from about 90° C. to about 180° C. with a polyalkylene succinimide wherein the polyalkylene is characterized by a number average molecular weight of about 700–5,000 and wherein the polyalkylene succinimide is characterized by the presence within its structure of from about 0.70 to about 2.0 succinic acid or succinic acid derivative moieties for each equivalent weight of polyalkylene, and then heating the nonpolymerizable lactone-polyalkylene succinimide reaction product with a $C_5$–$C_9$ lactone, such as E-caprolactone, at a temperature of at least about 80° C., and preferably from about 90° C. to about 180° C. and; and, in a further aspect, one or more objects of this invention are achieved by providing poly ($C_5$–$C_9$ lactone) adducts produced by such a process.

One or more additional objects of this invention are achieved by reacting E-caprolactone with a polyalkylene succinic acylating agent which has been post-treated to introduce into the structure thereof at least one lactone-reactive amino group and which has been further post-treated by reaction with a non-polymerizable lactone; one or more additional objects are accomplished by providing poly (E-caprolactone) adducts produced by such a process.

One or more objects of this invention can be illustrated in connection with the step-wise reactions between butyrolactone and a polyisobutenyl succinimide initiator having available primary amine functionality, followed by reaction with E-caprolactone as follows:

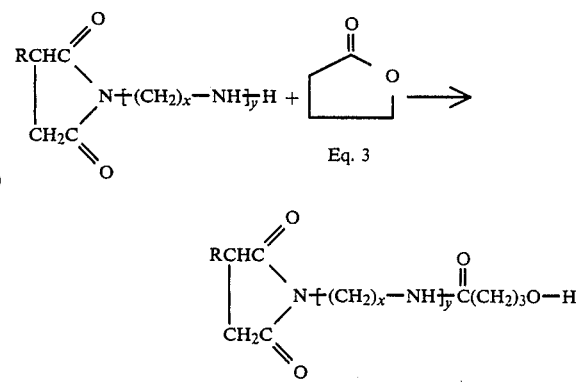

Eq. 3

-continued succinimide, followed by a post-polymerization reaction with E-caprolactone as

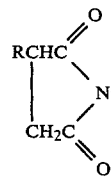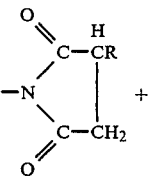

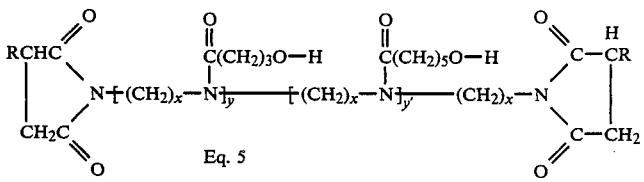

Eq. 5

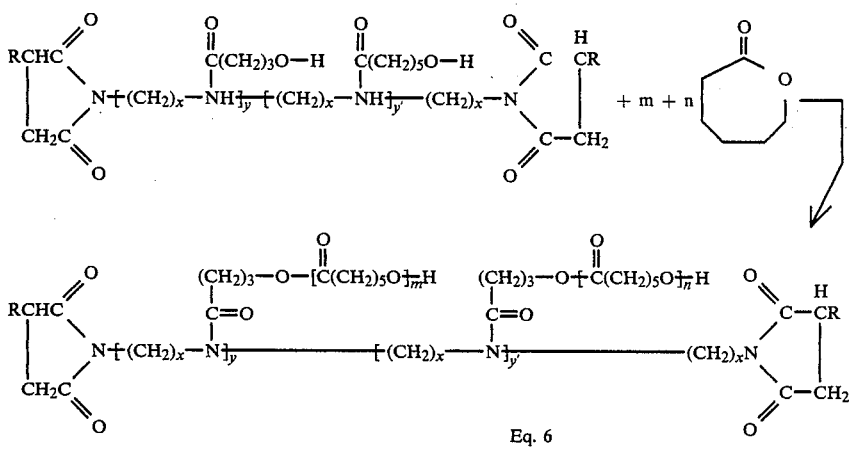

Eq. 6

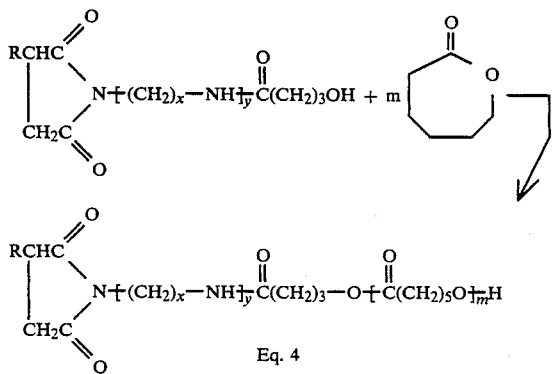

Eq. 4 where x is a number from 1 to 4, y is a number from 1 to 7, m has an average value of about 0.2 to about 100, preferably from 1 to about 20, most preferably from 1 to about 5, R represents polyisobutylene having a number average molecular weight of from about 700 to about 5,000, and the ratio (functionality) of succinic acid producing moieties is from about 0.70 to about 2.0 per equivalent weight of polyisobutylene. The above reactions can be conducted with or without a catalyst. However, it is generally preferred to employ a catalyst such as stannous octanoate in an amount of from about 100 to about 10,000 parts by weight of catalyst per one million parts of E-caprolactone in the second reaction, i.e., the polymerization reaction.

One or more additional objects can be illustrated in connection with the reaction between butyrolactone and a polyalkylene succinimide initiator having secondary amine functionality, such as a polyisobutenyl bis-succinimide, followed by a post-polymerization reaction with E-caprolactone as where x is a number from 1 to 4, y and y', independently, are numbers from 1 to 7, and m and n, independently, have a value of zero to about 100, preferably from 1 to about 20, most preferably from 1 to about 5, provided however that both m and n can not be zero, R represents polyisobutylne having a number average molecular weight of from about 700 to about 5,000, and the functionality of succinic acid producing moieties is from about 0.7 to about 2.0 per equivalent weight of polyisobutylene.

The novel non-polymerization/polymerizable lactone adducts of this invention are useful per se as an additive, e.g: a dispersant and/or detergent additive, for example in the same manner as disclosed in U.S. Pat. No. 3,219,666 where prior art derivatives of polyalkenyl succinic acids and nitrogen compounds are used as dispersant/detergents in lubricants, especially lubricants intended for use in the crankcase of internal combustion engines, gears, and power transmitting units. Accordingly, one or more objects of the invention are achieved by providing lubricating oil compositions, e.g. automatic transmission fluids, heavy duty oils suitable for use in the crankcases of gasoline and diesel engines, etc. containing the novel adducts of this invention. Such lubricating oil compositions may contain additional additives such as viscosity index improvers, antioxidants, corrosion inhibitors, detergents, pour point depressants, antiwear agents, etc.

Still further objects are achieved by providing concentrate compositions comprising from about 10 to about 80 wt. % of normally liquid, substantially inert, organic solvent/diluent, e.g. mineral lubricating oil, or other suitable solvent/diluent and from about 20 to about 90 wt. % of lactone modified adduct dispersant of this invention, as mentioned above and described in more detail hereinafter.

DESCRIPTION OF THE PREFERRED EMBODIMENTS

The Hydrocarbyl Dicarboxylic Acid Material

The long chain hydrocarbyl substituted dicarboxylic acid material, i.e. acid or anhydride, or ester, used in the invention includes a long chain hydrocarbon, generally a polyolefin, substituted with 0.7 to 2.0, preferably 1.00 to 1.5, e.g. 1.05 to 1.3 moles, per mole of polyolefin of an alpha or beta unsaturated $C_4$ to $C_{10}$ dicarboxylic acid, or anhydride or ester thereof, such as fumaric acid, itaconic acid, maleic acid, maleic anhydride, chloromaleic acid, dimethyl fumarate, chloromaleic anhydride, etc.

Preferred olefin polymers for reaction with the unsaturated dicarboxylic acids are polymers comprising a major molar amount of $C_2$ to $C_{10}$, e.g. $C_2$ to $C_5$ monoolefin. Such olefins include ethylene, propylene, butylene, pentene, octene-1, styrene, etc. The polymers can be homopolymers such as polyisobutylene, as well as copolymers of two or more of such olefins such as copolymers of: ethylene and propylene; butylen and isobutylene; propylene and isobutylene; etc. Other copolymers include those in which a minor molar amount of the copolymer monomers, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers will usually have a number average molecular weight ($M_n$) within the range of about 700 and about 5,000, more usually between about 700 and about 3,000. Particularly useful olefin polymers have a number average molecular weight within the range of about 900 and about 2,500 with approximately one terminal double bond per polymer chain. An especially useful starting material for a highly potent dispersant additive made in accordance with this invention is polyisobutylene. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

Processes for reacting the olefin polymer with the $C_4$–$C_{10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place; or, the olefin polymer can be first halogenated, for example, chlorinated or brominated to about 1 to 8, preferably 3 to 7 wt. % chlorine or bromine, based on the weight of polymer, by passing the chlorine or bromine through the polyolefin at a temperature of 100° to 250° C., e.g. 140° to 225° C. for about 0.5 to 10 preferably 1 to 7 hours. The halogenated polymer may then be reacted with sufficient unsaturated acid or anhydride at 100° to 250° C., usually about 140° to 180° C. for about 0.5 to 10, e.g. 3 to 8 hours, so the product obtained will contain about 1.0 to 1.5, preferably 1.06 to 1.20, e.g. 1.10 moles of the unsaturated acid per mole of the halogenated polymer. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. No. 1,440,219.

By the use of halogen, about 65 to 95 wt. % of the polyolefin, e.g. polyisobutylene will normally react with the dicarboxylic acid material. Upon carrying out a thermal reaction without the use of halogen or a catalyst, then usually only about 50 to 75 wt. % of the polyisobutylene will react. Chlorination helps increase the reactivity. For convenience, the aforesaid functionality ratios of dicarboxylic acid producing units to polyolefin of 0.70 to 2.0, 1.00 to 1.5 and 1.05 to 1.3 are based upon the total amount of polyolefin, that is the total of both the reacted and unreacted polyolefin, used to make the product.

Amine Neutralization of the Hydrocarbyl Dicarboxylic Acid Material

In order to form the lactone modified adduct dispersants of the present invention, the hydrocarbyl dicarboxylic material must first be neutralized with a polyfunctional amine. This will result in the formation of an imide or amide linkage, or a mixture of imide and amide linkages, in the hydrocarbyl dicarboxylic material and will add a lactone-reactive amino group thereto. The lactone-reactive amino group will initiate a subsequent ring opening reaction with the non-polymerizable lactone and thereby form an intermediate adduct. The intermediate adduct is then further modified by reaction with and polymerization of a $C_5$–$C_9$ polymerizable lactone to provide the novel adduct dispersants of this invention.

Useful amine compounds for neutralization of the hydrocarbyl substituted dicarboxylic acid material include polyamines of about 2 to 60, e.g. 3 to 20, most preferably 3 to 10, total carbon atoms in the molecule. These amines may be hydrocarbyl amines or may be hydrocarbyl amines including other non-interfering groups, e.g., alkoxy groups, amide groups, nitrile groups, imidazoline groups, and the like. Preferred amines are aliphatic saturated amines, including those of the general formula:

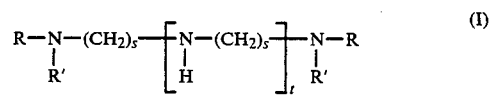

(I)

wherein R and R' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; and $C_1$ to $C_{12}$ alkylamino $C_2$ to $C_6$ alkylene radicals the same or a different number of from 2 to 6, preferably 2 to 4; and t is a number of from 0 to 10, preferably 2 to 7. If t=0, then at least one of R or R'; must be H such that there are at least two of either primary or secondary amino groups.

Non-limiting examples of suitable amine compounds include: 1,2-diaminoethane; 1,3-diaminopropane; 1,4- diaminobutane; 1,6-diaminohexane; polyethylene amines such as diethylene triamine; triethylene tetramine; tetraethylene pentamine; polypropylene amines such as 1,2-propylene diamine; di-(1,2-propylene) triamine; di-(1,3-propylene) triamine; N,N-dimethyl-1,3-diaminopropane; N,N-di-(2-aminoethyl) ethylene diamine; N-dodecyl-1,3-propane diamine; di-,and tri-tallow amines; amino morpholines such as N-(3-aminoproply) morpholine; etc.

Other useful amine compounds include: alicyclic diamines such as 1,4-di(aminomethyl) cyclohexane, and heterocyclic compounds such as morpholines, imidazolines, and N-aminolakyl piperazines of the general formula:

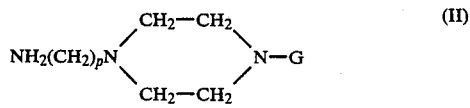

wherein G is independently selected from the group consisting of hydrogen and omega-(non-tertiary)aminoalkylene radicals of from 1 to 3 carbon atoms, and p is a number of from 1 to 4. Non-limiting examples of such amines include 2-pentadecyl imidazoline; N-(2-aminoethyl) piperazine; etc.

Commercial mixtures of amine compounds advantageously may be used. For example, one process for preparing alkylene amines involves the reaction of an alkylene dihalide (such as ethylene dichloride or propylene dichloride ) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. A low cost mixture of poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxalkylene polyamines such as those of the formulas:

$$NH_2 \text{ - alkylene -(0-alkylene)-}_m NH_2 \quad (III)$$

where m has a value of about 3 to 70 and preferably 10 to 35; and $$R \text{ -[- alkylene-(-O-alkylene-)-}_n NH_2]_a \quad (IV)$$

where n has a value of about 1 to 40 with the proviso that the sum of all the n's is from about 3 to about 70 and preferably from about 6 to about 35, R is a polyvalent saturated hydrocarbon radical of up to ten carbon atoms, and a is a number from 3 to 6. The alkylene groups in either formula III or IV may be straight or branched chain containing about 2 to 7, and preferably about 2 to 4 carbon atoms.

The above polyoxyalkylene polyamines, preferably polyoxyalkylene diamines and polyoxyalkylene triamines, may have average molecular weights ranging from about 200 to about 4,000 and preferably from about 400 to about 2,000. The preferred polyoxyalkylene polyamines include the polyoxyethylene and polyoxypropylene diamines and the polyoxypropylene triamines having average molecular weight ranging from about 200 to 2,000. The polyoxyalkylene polyamines are commercially available and may be obtained, for example, from the Jefferson Chemical Company, Inc. under the trade name "Jeffamines D-230, D-400, D-1000, D-2000, T-403", etc.

The amine is readily reacted with the hydrocarbyl dicarboxylic acid material, e.g. alkenyl succinic anhydride, by heating an oil solution containing 5 to 95 wt. % of dicarboxylic acid material to about 100° to 250° C., preferably 125° to 175° C., generally for 1 to 10, e.g. 2 to 6 hours until the desired amount of water is removed. The heating is preferably carried out to favor formation of imides or mixtures of imides and amides, rather than amides and salts.

While the amine may used in any amount effective to neutralize the hydrocarbyl dicarboxylic material, generally from about 0.5 to about 3.33, preferably about 0.75 to 2.5, e.g. 1.0 to 2.0 moles of dicarboxylic acid moiety, e.g. grafted maleic anhydride are used, per mole of the amine, e.g. bi-primary amine content. For example, for one mole of olefin reacted with sufficient maleic anhydride to add 1.0 mole of maleic anhydride groups per mole of olefin, when converted to a mixture of amides and imides, about 0.5 moles of amine with two primary groups preferably would be used; i.e. 2.0 moles of dicarboxylic acid moiety per mole of amine.

Still other useful amines are those which can be reacted, in a cyclodehydration reaction, with the hydrocarbyl substituted monounsaturated dicarboxylic acid producing material, such as polyisobutenyl succinic anhydride, to form what can be referred to as a macrocyclic or polycyclic polyamine compound. These amines, as discussed in detail in U.S. Pat. application Ser. No. 550977, filed 11/16/83, which application is incorporated herein by reference, may b generalized by the formula $$NH_2—Z—NH_2 \quad V$$

where Z may be $—CH_2CH_2CH_2—$, $(CH_2CH_2CH_2NH)_n CH_2CH_2CH_2—$, where n is 1-6, or $—(CH_2CH_2CH_2NH)_m CH_2(CH_2)_p(N-H—CH_2CH_2CH_2)_{m'}—$, where m and m' are each at least 1 and m+m' is 2-5, p is 1-4.

Further amines include polyamino propyl amines having C-substituents such as $C_{12}$–$C_{20}$ alkyl, $C_6$–$C_{10}$ aryl, hydroxyl, thiol, cyano, ethoxy, polyoxyethylene and polyoxypropylene having a degree of polymerizaton of 2-10 and other compatible non-reactive functional groups, but N-substituted polyamines are not suitable reactants in preparing the macrocyclic compounds in a cyclodehydration reaction, i.e. the nitrogen atoms must be either —NH or —$NH_2$. Preferably Z is $—CH_2CH_2CH_2—,—(CH_2CH_2CH_2NH)_n CH_2CH_2CH_2—$where n is 1-3, or $—(CH_2CH_2CH_2NH)_m(CH_2CH_2)(NHCH_2CH_2CH_2)_{m'}—$, where m and m' are as described above.

Formation of the macrocyclic and polycylic polyamine compounds proceeds by aminolysis of the hydrocarbyl substituted succinic anhydride, monocarboxylic acid or polycarboxylic acid using an inverse mode addition. Such a process will avoid the formation of noncyclic, imide products or other products resulting from chain extension. The first step of the synthesis is to slowly add the succinic anhydride or mono- or polycarboxylic acid to the polyamine compound at relatively low temperatures, such as room temperature, that is, about 20° C., up to about 100° C. in an inert hydrocarbon solvent, such as xylene, toluene, dichlorobenzene or a neutral paraffinic mineral oil. This inverse mode of addition is critical to form the 1:1 amid acid or amine carboxylate salt intermediate and inhibit or prevent formation of imide or bis-imide non-cyclic final products. The reaction temperature during this inverse addition of hydrocarbon succinic anhydride or carboxylic acid should be as low as possible, preferably below 100° C., and the optimum temperature will vary somewhat depending on the reactivity and structure of the anhydride compound. The first phase is believed to be the formation of an intermediate and the temperature and rate of addition should be merely sufficient to promote this reaction. Thus at the beginning of the reaction a molar excess of amine relative to moles of succinic anhydride or carboxylic acid groups present is used to minimize any chain extension or bis-imide formation. The formation of an intermediate 1:1 amic acid salt is indicated by the disappearance of carbonyl bands in the infrared spectrum of the anhydride reactant. The formation of the amine carboxylate intermediate is indicated by the appearance of a carbonyl based on the infrared spectrum of the product due to carboxylate formation.

The second step of the process, the cyclodehydration of the amic acid or amine carboxylate intermediate is effected at a temperature consistent with the reactivity of the intermediate salt, with suitable cyclodehydration temperatures ranging from 130° C.-250° C., preferably about 140° C. to 175° C. Formation of the macrocyclic polyamine structure is indicated by cessation of evolution of water and by the maximization of the C=N absorption band at about the 6 micron range in the infrared spectrum of the reaction product.

It is critical to the cyclodehydraton process that this inverse mode of addition be used to effect the aminolysis of the succinic anhydride or carboxylic acid. Thus the slow addition of hydrocarbon succinic anhydride or carboxylic acid to the well stirred polyamine, preferably in solution, maintained at about 20° to 100° C. maximizes the formation of the 1:1 intermediate salt which upon further heating at 130° C.-250° C. undergoes cyclodehydration to the desired macrobicyclic polyamine product.

A preferred technique for preparing the macrocyclic and polycyclic compounds comprises the additional step of heat soaking the reaction mixture subsequent to the addition of the hydrocarbyl substituted succinic anhydride, mono- or polycarboxylic acid by maintaining the reaction mixture at a temperature of 80° to 130° C. for 1 to 3 hours and prior to increasing the temperature to effect the cyclodehydration reaction. After the conclusion of the heat soak period, the temperature of the reaction mixture is increased to the cyclodehydration range of 130° to 250° C. but at least 20° C. higher than the temperature employed during the heat soaking step.

THE NON-POLYMERIZABLE LACTONE MATERIAL

In one aspect of the invention, intermediate adducts are prepared by reacting a non-polymerizable lactone material with the neutralized hydrocarbyl substituted dicarboxylic acid material.

Useful non-polymerizable lactone material for this process include lactones and thiolactones having up to four carbon atoms in the lactone ring, e.g. 2 to 4 carbon atoms. The lactone materials may be substituted or unsubstituted and the substituents, if any, may comprise, for example, $C_1$ to $C_{25}$ straight or branched chain alkyl; aryl, aralkyl, or cycloalkyl having 6 to 60 total carbon atoms; $C_1$ to $C_{12}$ alkoxy or other groups which would not interfere with the ring opening reaction and adduct formation. The preferred lactone materials have no more than two substituent groups, and the more preferred lactones are unsubstituted.

Non-limiting examples of the useful lactone include beta-propriolactone, methyl-betapropriolactone, gamma-butyl rolactone, methyl-gammabutyrolactone, and the like, with butyrolactone being particularly preferred. Non-limiting examples of the useful thiolactone include beta-thiopropriolactone, methyl-betathiopropriolactone, gamma-thiobutyrolactone, methyl-gamma thiobutyrolactone, and the like.

For convenience, the following discussion will be limited to the lactones, but it will be understood the disclosure contained hereinafter will be equally applicable to non-polymerizable thiolactones as described above.

The ring opening addition reaction of the non-polymerizable lactone with the neutralized hydrocarbyl substituted dicarboxylic acid material may be carried out, with or without a catalyst, simply by heating a mixture of the non-polymerizable lactone and dicarboxylic acid material in a reaction vessel in the absence of a solvent at a temperature of from about 30° C. to about 200° C., more preferably at a temperature of about 75° C., to about 180° C., and most preferably about 90° C. to about 160° C. for a sufficient period of time to effect ring opening addition. Optionally, a solvent for the non-polymerizable lactone and/or intermediate adduct can be employed to control viscosity and/or reaction rates.

In one preferred embodiment of the invention, the non-polymerizable lactone is reacted with a polyisobutenyl succinimide which has been prepared by neutralizing polyisobutenyl succinic acid with an aliphatic diamine as outlined above. This reaction can be depicted generally by the following equation: when the succinimide has available primary amino functionality:

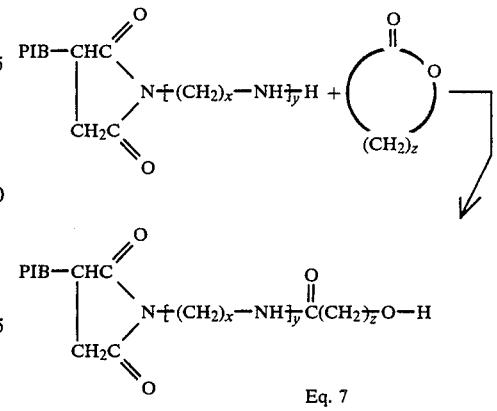

Eq. 7 where x is a number from 1 to 4, y is a number from 1 to 10, preferably 3 to 7, z is a number from 1 to 3, PIB represents polyisobutylene having a number average molecular weight of from about 700 to about 5,000, preferably about 900 to about 3,000, and the ratio (functionality) of succinic acid moieties is from about 0.7 to about 2.0 per equivalent weight of polyisobutylene, and more preferably from about 1.00 to about 1.5 per equivalent weight of polyisobutylene.

When the succinimide has available secondary amino functionality, the reaction can be depicted generally by the following equation:

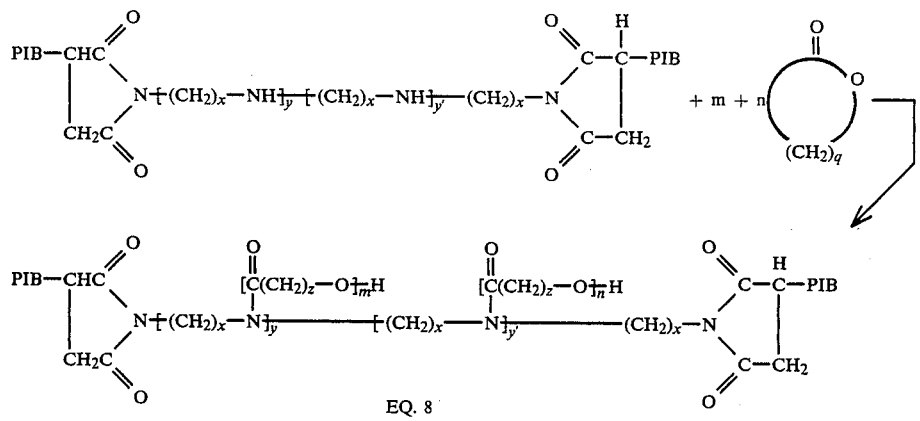

EQ. 8 where x is a number from 1 to 4, y is a number from 1 to 6, y' is a number from 1 to 6, q is a number from 4 to 8, and m and n, independently, are zero or 1, provided however that both m and n can not be zero.

Lactone Polymer Capping of the Non-Polymerizable Lactone Modified Amine Neutralized Hydrocarbyl Substituted Dicarboxylic Intermediate Material In an aspect of invention, the novel lactone modified dispersant adducts are prepared by polymerizing a $C_5$–$C_9$ polymerizable lactone using at least one residual lactone-reactive functional substituent on the non-polymerizable lactone modified hydrocarbyl substituted dicarboxylic acid material as the ring opening and polymerization initiator.

Useful polymerizable lactone compounds for this process include polymerizable lactones having at least five carbon atoms in the lactone ring, e.g. 5 to 9 carbon atoms. The lactones may be substituted or unsubstituted and the subtituents, if any, may comprise, for example, $C_1$ to $C_{25}$ straight or branched chain alkyl; aryl, aralkyl, or cycloalkyl having 6 to 60 total carbon atoms; $C_1$ to $C_{12}$ alkoxy or other groups which would not interfere with the ring opening reaction and adduct formation. The preferred lactones have no more than two substituent groups, and the more preferred lactones are unsubstituted.

Non-limiting examples of the useful lactone include delta-valerolactone, methyl-delta-valerolactone, E-caprolactone, methyl-E-caprolactone, dimethyl-E-caprolactone, methoxy-E-caprolactone, cyclohexyl-E-caprolactone, methylbenzyl-E-caprolactone, caprylolactone, methyl-caprylolactone, and the like, with E-caprolactone being particularly preferred.

The ring opening polymerization of the lactone by reaction with the non-polymerizable lactone modified hydrocarbyl substituted dicarboxylic acid material may be carried out, with or without a catalyst, simply by heating a mixture of the polymerizable lactone and modified dicarboxylic acid material intermediate in a reaction vessel in the absence of a solvent at a temperature of from about 30° C. to about 200° C., more preferably at a temperature of about 75° C. to about 180° C., and most preferably about 90° to about 160° C., for a sufficient period of time to effect polymerization. Optionally, a solvent for the monomer and/or polymer can be employed to control viscosity and/or reaction rates.

In one preferred embodiment of the invention, the $C_5$–$C_9$ lactone is reacted with a non-polymerizable lactone modified polyisobutenyl succinimide which has been prepared by first neutralizing polyisobutenyl succinic acid with an aliphatic diamine and then reacting the neutralized polyisobutylene succinic acid material with a non-polymerizable lactone such as butyrolactone, as outlined above. This reaction can be depicted, for example, by the following general equations:

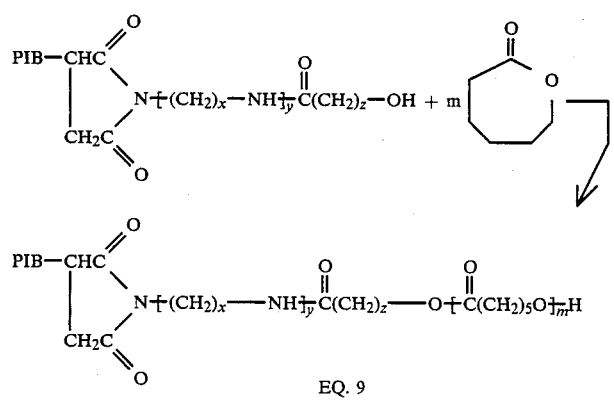

EQ. 9

-continued

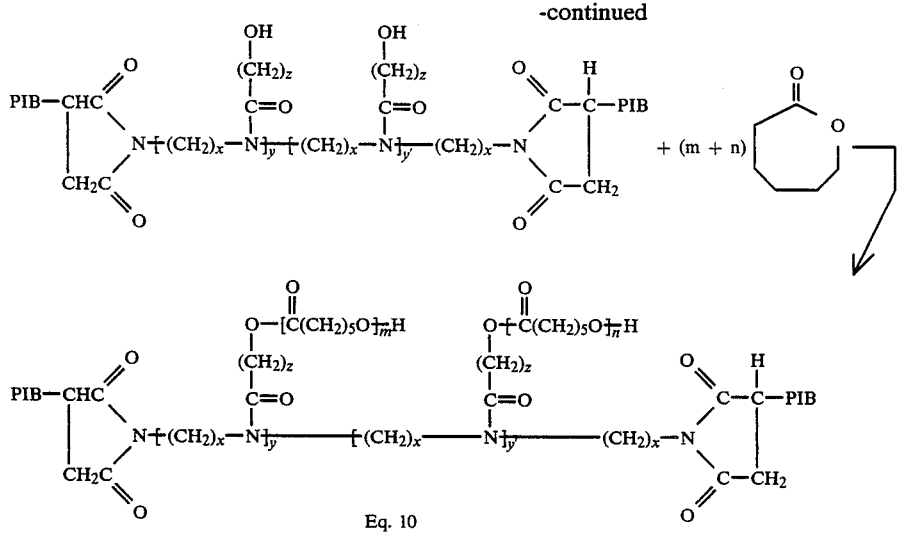

Eq. 10 where x is a number from 1 to 4, y and y', independently, are a number from 1 to 10, preferably 3 to 7, m and n have an average value of from 0.2 to about 100, preferably from 0.5 to about 20, z is number 1 from 1 to 3, PIB represents polyisobutylene having a number average molecular weight of from about 700 to about 5,000, preferably about 900 to about 3,000, and the ratio (functionality) of succinic acid moieties is from about 0.7 to about 2.0 per equivalent weight of polyisobutylene, and more preferably from about 1.00 to about 1.5 per equivalent weight of poly- isobutylene.

Catalysts useful in the promotion of the above-identified polymerization/modified reactions are selected from the group consisting of stannous octanoate, stannous hexanoate, stannous oxalate, tetrabutyl titanate, a variety of metal organic based catalysts, acid catalysts and amine catalysts, as described on page 266, and forward in a book chapter authored by R. D. Lundberg and E. F. Cox entitled, "Kinetics and Mechanisms of Polymerization: Ring Opening Polymerization"; edited by Frisch and Reegen, published by Marcel Dekker in 1969, wherein stannous octanoate is an especially preferred catalyst. The catalyst may be added to the reaction mixture at any effective concentration level. However, the catalyst generally is added at a concentration level of about 50 to about 10,000 parts of catalyst per one million parts by weight of total reaction mixture.

When initiating the polymerization of the polymerizable lactone monomer under the conditions described herein, the polymerizable lactone will react selectively first with the terminal hydroxy groups present in the intermediate adduct initiator molecule and form a polymer adduct containing the polylactone ester group and a terminal hydroxyl group. In the absence of a catalyst, any excess polymerizable lactone monomer will either react with a secondary amino group present in the initiator molecule or with the hydroxyl group formed via the reaction of the non-polymerizable lactone with the neutralized hydrocarbyl substituted dicarboxylic material. In the presence of a catalyst, such as stannous octanoate, it is believed that the polymerizable lactone preferably will react somewhat more readily with the terminal hydroxyl group than with a secondary amino group, thus producing a polylactone ester adduct.

In the reactions shown above, the values of m and n, or the average degree of polymerization (DP) of the polymerizable lactone monomers, may vary depending upon the intended application. At DP's of much greater than about 10, e.g., greater than about 50, the polylactone adducts can exhibit crystallinity; a characteristic which is undesirable in an oil soluble dispersant due to the consequent high viscosity or even solid, oil products which can be obtained. However, at lower DP's, oil soluble adducts possessing low viscosity and desirable sludge and varnish inhibition characteristics are obtained. Accordingly, regardless of the identity of the non-polymerizable lactone, the polymerizable lactone, and the neutralized hydrocarbyl substituted dicarboxylic acid material, the value of m and n, or the average degree of polymerization (DP), should be between about 0.2 and about 100, more preferably between about 0.2 and about 50, and most preferably between about 0.5 and about 20.

Further aspects of the present invention reside in the formation of metal complexes and other post-treatment derivatives, e.g., borated derivatives of the novel additives prepared in accordance with this invention. Suitable metal complexes may be formed in accordance with known techniques of employing a reactive metal ion species during or after the formation of the present lactone adduct dispersant materials. Complex-forming metal reactants include the nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be found in U.S. Pat. Nos. 3,306,908 and Re. 26,433.

Post-treatment compositions include those formed by reacting the novel additives of the present invention with one or more post-treating reagents, usually selected from the group consisting of boron oxide, boron oxide hydrate, boron halides, boron esters, boron acids, sulfur, sulfur chlorides, phosphorous sulfides and oxides, carboxylic acid or anhydride acylating agents, epoxides and episulfides and acrylonitriles. The reaction of such post-treating agents with the novel additives of this invention is carried out using procedures known in the art. For example, boration may be accomplished in accordance with the teachings of U.S. Pat. No. 3,254,025 by treating the lactone modified dispersant additives with a boron oxide, halide, ester or acid. Treatment may be carried out by adding about 1–3 wt. % of the boron compound, preferably boric acid, and heating and stirring the reaction mixture at about 135° C. to 165° C. for 1 to 5 hours followed by nitrogen stripping and filtration, if desired. Mineral oil or inert organic solvents facilitate the process.

The Compositions

The lactone modified additives of the present invention have been found to possess very good dispersant/detergent properties as measured herein in a wide variety of environments.

Accordingly, the lactone derived adducts are used by incorporation and dissolution into an oleaginous material such as fuels and lubricating oils.

When the additives of this invention are used in normally liquid petroleum fuels such as middle distillates boiling from about 65° to 430° C. including kerosene, diesel fuels, home heating fuel oil, jet fuels, etc., a concentration of the additive in the fuel in the range of typically from about 0.001 to about 0.5, and preferably 0.001 to about 0.1 weight percent, based on the total weight of the composition, will usually be employed.

The non-polymerizable and polymerizable lactone derived dispersant additives find their primary utility in lubricating oil compositions which employ a base oil in which the additives are dissolved or dispersed.

Such base oils may be natural or synthetic although the natural base oils will derive a greater benefit.

Thus, base oils suitable for use in preparing lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the dispersant additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols, polyalphaolefins, alkyl benzenes, organic esters of phosphoric acids, polysilicone oils, etc.

Natural base oils include mineral lubricating oils which may vary widely as to their crude source, e.g., whether paraffinic, naphthenic, mixed, paraffinic-naphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, molecular sieves, etc.

The lubricating oil base stock conveniently has a viscosity of typically about 2.5 to about 12, and preferably about 2.5 to about 9 cs. at 100° C.

Thus, the lactone derived additives of the present invention can be employed in a lubricating oil composition which comprises lubricating oil, typically in a major amount, and the dispersant additive, typically in a minor amount, which is effective to impart enhanced dispersancy, relative to the absence of the additive. Additional conventional additives selected to meet the particular requirements of a selected type of lubricating oil composition can be included as desired.

The dispersant additives of this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the dispersant additives, for instance, are soluble or stably dispersible in oil to an extent sufficient to exert their intended effect in the environment in which the oil is employed. Moreover, the additional incorporation of other additives may also permit incorporation of higher levels of a particular dispersant, if desired.

Accordingly, while any effective amount of the dispersant additives can be incorporated into the lubricating oil composition, it is contemplated that such effective amount be sufficient to provide said lube oil composition with an amount of the additive of typically from about 0.10 to about 15 e.g., 0.1 to 10, and preferably from about 0.1 to about 7 wt. %, based on the weight of said composition.

The dispersant additives of the present invention can be incorporated into the lubricating oil in any convenient way. Thus, they can be added directly to the oil by dispersing, or dissolving the same in the oil at the desired level of concentration typically with the aid of a suitable solvent such as toluene, or tetrahydrofuran. Such blending can occur at room temperature or elevated temperatures. Alternatively, the dispersant additives may be blended with a suitable oil-soluble solvent and base oil to form a concentrate, and then blending the concentrate with lubricating oil base stock to obtain the final formulation. Concentrates will typically contain from about 20 to about 60 wt. %, by weight dispersant additive, and typically from about 80 to about 20%, preferably from about 60 to about 20% by weight base oil, based on the concentrate weight.

The lubricating oil base stock for the dispersant additives of the present invention typically is adapted to perform a selected function by the incorporation of additives therein to form lubricating oil compositions (i.e., formulations).

Representative additives typically present in such formulations include viscosity modifiers, corrosion inhibitors oxidation inhibitors, friction modifiers, other dispersants, anti-foaming agents, anti-wear agents, pour point depressants and the like.

Viscosity modifiers impart high and low temperature operability to the lubricating oil and permit it to remain shear stable at elevated temperatures and also exhibit acceptable viscosity or fluidity at low temperatures.

Viscosity modifiers are generally high molecular weight hydrocarbon polymers including polyesters. The viscosity modifiers may also be derivatized to include other properties or functions, such as the addition of dispersancy properties.

These oil soluble viscosity modifying polymers will generally have number average molecular weights of from $10^3$ to $10^6$, preferably $10^4$ to $10^6$, e.g., 20,000 to 250,000, as determined by gel permeation chromatography or membrane osmometry.

Representative examples of suitable viscosity modifiers are any of the types known to the art including polyisobutylene, copolymers of ethylene and propylene, polymethacrylates, methacrylate copolymers, copolymers of an unsaturated dicarboxylic acid and vinyl compound and interpolymers of styrene and acrylic esters.

Corrosion inhibitors, also known as anticorrosive agents, reduce the degradation of the metallic parts contacted by the lubricating oil composition. Illustrative of corrosion inhibitors are zinc dialkyldithiophosphate, phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of 15° to 320° C. Neutralization of the phosphosulfurized hydrocarbon may be effected in the manner taught in U.S. Pat. No. 1,969,324.

Oxidation inhibitors reduce the tendency of mineral oils to deteriorate in service which deterioration is evidenced by the products of oxidation such as sludge and varnish-like deposits on the metal surfaces. Such oxidation inhibitors include alkaline earth metal salts of alkylphenolthioesters having preferably $C_5$ to $C_{12}$ alkyl side chains, e.g., calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U. S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N-(hydroxyalkyl)alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis alkanols such as described in U.S. Pat. No. 4,344,853, disclosure of this patent also being herein incorporated by reference.

Dispersants maintain oil insolubles, resulting from oxidation during use, in suspension in the fluid thus preventing sludge flocculation and precipitation or deposition on metal parts. Suitable dispersants include high molecular weight alkyl succinates, the reaction product of oil-soluble polyisobutylene succinic anhydride with ethylene amines such as tetraethylene pentamine and borated salts thereof.

Pour point depressants lower the temperature at which the fluid will flow or can be poured. Such depressants are well known. Typically of those additives which usefully optimize the low temperature fluidity of the fluid are $C_8$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional antiwear agents are zinc dialkyldithiophosphate, zinc diaryldithiosphate and magnesium sulfonate.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts which are effective to provide their normal attendant function. Representative effective amounts of such additives are illustrated as follows:

| Compositions | Wt. % A.I. (Preferred) | Wt. % A.I. (Broad) |
|---|---|---|
| Viscosity Modifier | .01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | .01–5 |
| Mineral Oil Base | Balance | Balance |

When other additives are employed, it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the dispersant additives of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (A.I.) content of the additive, and/or upon the total weight of any additive-package, or formulation which will be the sum of the A.I. weight of each additive plus the weight of total oil or diluent. As used herein, the terms lactone derived dispersant additive and lactone modified dispersant additive are meant to describe a dispersant additive which has been prepared by first modifying a hydrocarbyl substituted dicarboxylic acid material, which has been neutralized with a polyamine, with a non-polymerizable lactone material, and then further reacting the non-polymerizable lactone/neutralized hydrocarbyl substituted dicarboxylic acid material intermediate reaction product with a polymerizable lactone such that the polymerizable lactone undergoes polymerization using a lactone reacting functional substituent on the intermediate reaction product as a ring opening and polymerization initiator.

This invention will be further understood by reference to the following examples, wherein all parts are parts by weight and all molecular weights are number average molecular weights unless otherwise noted, and which include preferred embodiments of the invention.

EXAMPLE 1

Part A

A polyisobutenyl succinic anhydride (PIBSA) having an SA:PIB ratio of 1.31 succinic anhydride (SA) moieties per polyisobutylene (PIB) molecule of 1300 $M_n$ was prepared by heating a mixture of 100 parts of polyisobutylene with 13 parts of maleic anhydride to a temperature of about 220° C. When the temperature reached 120° C., chlorine addition was begun and 10.5 parts of chlorine at a constant rate were added to the hot mixture for about 5 hours. The reaction mixture was then heat soaked at 220° C. for about 1.5 hours and then stripped with nitrogen for about 1 hour. The resulting polyisobutenyl succinic anhydride had an ASTM Saponfication Number of 103 which calculates to a succinic anhydride (SA) to polyisobutylene (PIB) ratio of 1.31 based upon the starting PIB as follows:

$$\text{SA:PIB ratio} = \frac{\text{SAP} \times M_n}{112200 - (96 + \text{SAP})} =$$

$$\frac{103 \times 1300}{1200 - (96 \times 103)} = 1.31$$

The PIBSA product was 88 wt. % active ingredient (a.i.), the remainder being primarily unreacted PIB. The SA:PIB ratio of 1.31 is based upon the total PIB charged to the reactor as starting material, i.e., both the PIB which reacts and the PIB which remains unreacted.

Part B

The PIBSA of Part A was aminated as follows:

300 grams (0.1846 moles) of the PIBSA of Part A were added to a reaction flask and diluted to a saponification number of 69 and 59% active ingredient with 74 grams of S150N lubricating oil (solvent neutral oil having a viscosity of about 150 SSU at 100° C.). The diluted PIBSA was heated to about 149° C. Then, 23.27 grams (0.1231 mole) of a tetraethylene pentamine and 74 grams of S150 lubricating oil was added and the mixture was heated to 150° C. for about 2 hours; followed by 2 hours of nitrogen stripping, then cooling to give the final product (PIBSA-TEPA). This product had a kinematic viscosity of 162 cs. at 100° C., a nitrogen content of 2.48 wt. % and contained approximately 50 wt. % a.i., i.e. the material contained about 50 wt. % PIBSA-TEPA and 50 wt. % unreacted PIB and mineral oil (S150N).

Part C

The PIBSA-TEPA product of Part B was reacted with butyrolactone as follows:

About 5.35 grams (0.0616 mole) of butyrolactone was added to the entire PIBSA-TEPA reaction product of Part B and the mixture was heated for 5 hours at 160° C. while being maintained under a nitrogen blanket. The reaction mixture was then cooled and filtered. This product had a kinematic viscosity of 503.4 cs. at 100° C. and analyzed for 2.47 wt. % nitrogen.

Part D

The PIBSA-TEPA-BUTYROLACTONE product of Part C was reacted with E-caprolactone as follows:

The PIBSA-TEPA-BUTYROLACTONE reaction mixture of Part C was heated to about 160° C. and 7 grams (0.03 moles) of E-caprolactone (CL) and 0.25 grams of stannous octanoate were added. This reaction mixture was heated to 160° C. and held at this temperature for 2 hours while stirring under a nitrogen blanket. The resulting PIBSA-TEPA-BUTYROLACTONE-POLYCAPROLACTONE adduct was then stripped with a mild stream of nitrogen for one half hour and collected. Infrared analysis of the adduct indicated complete opening of the lactone ring. The product had a kinematic viscosity of 607.2 cs. at 10020 C., and a nitrogen content of 2.46 wt. %.

Table I, which follows summarizes the characteristics of the dispersant materials prepared in accordance with EXAMPLE 1, Parts B, C and D.

TABLE I

PROPERTIES OF PIBSA-AMINE-CL PRODUCT

| Dispersant Additive Ex. Part No. | SA:PIB[1] | Wt. % N | PIB, $M_n^2$ | SAP[3] | PIBSA/TEPA[4] | PIBSA/TEPA/BL/CL[5] |
|---|---|---|---|---|---|---|
| B | 1.31 | 2.48 | 1300 | 69 | 1.5 | 1.5:1:0:0 |
| C | 1.31 | 2.47 | 1300 | 69 | 1.5 | 1.5:1:0.5:0 |

TABLE I-continued
PROPERTIES OF PIBSA-AMINE-CL PRODUCT

| Dispersant Additive Ex. Part No. | SA:PIB[1] | Wt. % N | PIB, $M_n$[2] | SAP[3] | PIBSA/TEPA[4] | PIBSA/TEPA/BL/CL[5] |
|---|---|---|---|---|---|---|
| D | 1.31 | 2.46 | 1300 | 69 | 1.5 | 1.5:1:05:0.5 |

[1]ratio of succinic anhydride moieties (SA) per polyisobutylene (PIB) molecule.
[2]number average molecular weight of the PIB molecules.
[3]ASTM Saponification Number AM-I-769–81
[4]ratio of polyisobutylene succinic anhydride (PIBSA) moieties to tetraethylene pentamine (TEPA) moieties.
[5]ratio of PIBSA moieties to TEPA moieties to butyrolactone (BL) moieties to caprolactone (CL) moieties.

Sludge Inhibition and Varnish Inhibition Bench Tests

Samples of the dispersant adducts prepared in Parts B, C and D of the foregoing EXAMPLE were subjected to a standard sludge inhibition bench test (SIB) and a standard varnish inhibition bench test (VIB). The SIB and VIB tests provide a basis of comparison between the prior art butyrolactone modified adduct, the corresponding prior art PIBSA-TEPA dispersant and the adduct dispersant of this invention which has been modified both with a non-polymerizable lactone (butyrolactone) and a polymerizable lactone (E-caprolactone).

The SIB and VIB tests forecast the performance of a lubricant in a gasoline engine. These tests are described below:

The SIB Test employs a used crankcase mineral lubricating oil composition having an original viscosity of about 325 SSU at 37.8° C. that has been used in a taxicab driven generally for short trips only thereby causing a build up of a high concentration of sludge precursors. The oil used contains only a refined base mineral oil, a viscosity index improver, a pour point depressant and a zinc dialkyldithiophosphate anti-wear additive. The oil contains no sludge dispersants. Such used oil is acquired by draining and refilling taxicab crankcases at about 1,000–2,000 mile intervals.

The SIB Test is conducted in the following manner: The used crankcase oil is freed of sludge by centrifuging for one half hour at about 39,000 gravities (gs). The resulting clear bright red oil is then decanted from the insoluble sludge particles. However, the supernatant oil still contains oil-soluble sludge precursors which, under the conditions employed by this test, will tend to form additional oil-insoluble deposits of sludge. The sludge inhibiting properties of the additives being tested are determined by adding to portions of the used oil 0.5 wt. %, on an active basis, of the particular additive being tested. Ten grams of each oil sample being tested is placed in a stainless steel centrifuge tube and is heated at 140° C. for 16 hours in the presence of air. Following the heating, the tube containing the oil being tested is cooled and then centrifuged for 30 minutes at about 39,000 gs. Any deposits of new sludge that form in this step are separated from the oil by decanting supernatant oil and then carefully washed with 15 ml. of pentane to remove all remaining oils from the sludge. The weight, in milligrams, of the new solid sludge that forms in the test is determined by drying the residue and weighing it. The results are reported as milligrams of sludge per ten grams of oil, thus measuring differences as small as one part per ten thousand. The less new sludge formed, the more effective is the additive as a dispersant. In other words, if the additive is effective, it will hold at least a portion of the new sludge that forms on heating and oxidation, stably suspended in the oil so that it does not precipitate during the centrifuging period.

In the VIB Test, a test sample consisting of ten grams of lubricating oil containing 0.5 wt. %, on an active basis, of the additive being evaluated is used. The test oil is a commercial lubricating oil obtained from a taxi after about 2000 miles of driving with said lubricating oil. Each sample is heat soaked overnight at about 140° C. and thereafter centrifuged to remove the sludge. The supernatant fluid of each sample is subjected to heat cycling from about 150° C. to room temperature over a period of 3.5 hours at a frequency of about two cycles per minute. During the heating phase, a gas containing a mixture of 0.7 volume percent $SO_2$, 1.4 volume percent NO and the balance air is bubbled through the test samples and during the cooling phase, water vapor was bubbled through the test samples. At the end of the test period, which testing cycle can be repeated as necessary to determine the inhibiting effect of any additive, the wall surfaces of the test flasks in which the samples are contained are visually evaluated as to the varnish inhibition. The amount of varnish deposited on the walls is rated at values of from one to eleven with the higher number being the greater amount of varnish. It has been found that this test forecasts the varnish results obtained as a consequence of carrying out the ASTM MS-VD engine test which is described more fully hereinbelow.

Table II, which follows, summarizes the compositions tested and the test results.

TABLE II
SLUDGE INHIBITION AND VARNISH INHIBITION BENCH TESTS

| SAMPLE | SA:PIB | Wt. % N | PIB $M_n$ | SAP | PIBSA/TEPA/BL/CL | SIB[1] | VIB[2] |
|---|---|---|---|---|---|---|---|
| B | 1.31 | 2.48 | 1300 | 69 | 1.5:1:0:0 | 2.78 | 5 |
| C | 1.31 | 2.47 | 1300 | 69 | 1.5:1:0.5:0 | 1.74 | 4.5 |
| D | 1.31 | 2.46 | 1300 | 69 | 1.5:1:0.5:0.5 | 0.14 | 3.5 |

[1]mg sludge per 10 mg of sludge (rated on basis of 1 to 10, 1 being the best rating).
[2]varnish rating (visual: rated 1 to 11, 1 being the best rating).

The data in Table II shows that the VIB and SIB values of the PIBSA-TEPA dispersant which was modified with both non-polymerizable lactone (butyrolactone) and polymerizable lactone (E-caprolactone) provides superior performance over both untreated PIBSA-TEPA dispersant and PIBSA-TEPA dispersant which has been modified only with the non-polymerizable lactone (butyrolactone).

As used in this specification and claims, the terms "dicarboxylic acid producing material" and "dicarboxylic acylating agent" are used synonymously and are meant to describe dicarboxylic acids, anhydrides, esters, etc. Non-limiting examples of such materials include fumaric acid, itaconic acid, maleic acid, maleic anhydride, succinic acid, succinic anhydride, chloromaleic acid, dimethyl fumarate, chloromaleic anhydride, etc.

As will be evident to those skilled in the art, various modifications on this invention can be made or followed, in light of the foregoing disclosure and illustrative examples, tables and discussion, without departing from the spirit and scope of the disclosure or from the scope of the invention as set forth in the following claims.

What is claimed is:

1. A lactone modified adduct of an aminated, hyrdocarbyl substituted $C_4$-$C_{10}$ dicarboxylic acid producing material useful as an oil additive and formed by first reacting a non-polymerizable lactone selected from the group consisting of lactones and thiolactones having up to four carbon atoms in the lactone ring with an aminated, hyrdocarbyl substituted $C_4$-$C_{10}$ dicarboxylic acid producing material to form an intermediate adduct, and then, in a separate step, reacting said intermediate adduct with a $C_5$-$C_9$ polymerizable lactone at a temperature of from about 30° to about 200° C. for a period sufficient to effect ring opening polymerization of said $C_5$-$C_9$ lactone to form the lactone modified adduct acid producing material being formed by reacting an olefin polymer of a $C_2$-$C_{10}$ monoolefin having a number average molecular weight of about 700 to about 5,000 and a $C_4$-$C_{10}$ monounsaturated dicarboxylic acid material, wherein there is an average of 0.7 to about 2.0 sicarboxylic producing moieties per molecule of said olefin polymer used in the reaction, said aminated hydrocarbyl substituted $C_4$-$C_{10}$ dicarboxylic acid producing material having been aminated with a non-heterocyclic amine selected from the group consisting of polyamines of about 2 to 60 total carbon atoms and about 2 to 12 nitrogen atoms in the molecule, and said lactone modified adduct product containing the unit

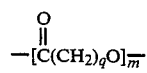

wherein m represents the average degree of polymerization and has a average value of from 0.2 to about 100 and q is 4 to 8.

2. The lactone modified additive material according to claim 1, wherein said $C_5$-$C_9$ polymerizable lactone is E-caprolactone.

3. The lactone modified adduct material according to claim 1, wherein said non-polymerizable lactone is butyrolactone.

4. The lactone modified adduct material according to claim 2, wherein said non-polymerizable lactone is butyrolactone.

5. The lactone modified adduct material according to claim 1, wherein said $C_4$-$C_{10}$ dicarboxylic acid producing material is maleic anhydride.

6. The lactone modified adduct material according to claim 4, wherein said $C_4$-$C_{10}$ dicarboxylic acid producing material is maleic anhydride.

7. The lactone modified adduct material according to claim 1, wherein said olefin polymer is polyisobutylene.

8. The lactone modified adduct material according to claim 2, wherein said olefin polymer is polyisobutylene.

9. The lactone modified adduct material according to claim 6, wherein said olefin polymer is polyisobutylene.

10. The lactone modified adduct material according to claim 9, wherein said amine is an aliphatic saturated amine having the formula

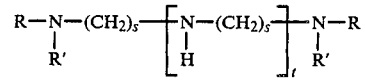

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6; and t is a number of from 0 to 10, with the provision that when t=0, at least one of R or R' must be H such that there are at least two of either primary or secondary amino groups.

11. The lactone modified adduct material of claim 10, wherein said amine is selected from the group consisting of 1, 2-diaminoethane; 1, 3-diaminopropane; 1, 4-diaminobutane; 1, 6-diaminohexane; diethylene triamine; triethylene tetramine; tetraethylene pentamine; 1, 2-propylene diamine; di-(1, 2-propylene)triamine; di-(1, 3-propylene) triamine; N, N-dimethyl-1, 3-diaminopropane; N, N-di-(2-aminoethyl) ethylene diamine; and N-dodecyl-1, 3-propane diamine.

12. The lactone modified adduct material according to claim 9, wherein said amine is a mixture of poly (ethyleneamines) averaging about 5 to about 7 nitrogen atoms per molecule.

13. The lactone modified adduct material of claim 9, wherein said amine is a polyoxyalkylene polyamine having the formula:

$NH_2$-alkylene -(0-alkylene)-$_m NH_2$ where m has a value of about 3 to 70; or R -[alkylene-(0-alkylene)-$_n$ $NH_2$]a where n has a value of about 1 to 40 with the provision that the sum of all the nos is from about 3 to about 70, R is a polyvalent saturated hydrocarbon radical of up to ten carbon atoms, and a is a number from 3 to 6.

14. The lactone modified adduct material of claim 9, wherein said amine is capable of reacting with said hydrocarbyl substituted acid producing material, in a cyclodehydration reaction, said amine having the generalized formula $NH_2$-Z-$NH_2$, wherein Z is selected from the group consisting of —$CH_2CH_2CH_2$—, —($CH_2CH_2CH_2NH)_nCH_2CH_2CH_2$—, where n is 1 to 6, and —($CH_2CH_2CH_2NH)_mCH_2(CH_2)_p$(N-H—$CH_2CH_2CH_2)_{m'}$—, where m and m' are each at least 1, m+m' is from 2 to 5, p is from 1 to 4.

15. The lactone modified adduct material according to claim 1, wherein the average value of m is 0.5 to about 20.

16. The lactone modified adduct material according to claim 4, wherein the average value of m is 0.5 to about 20.

17. The lactone modified adduct material according to claim 7, wherein the average value of m is 0.5 to about 20.

18. The lactone modified adduct according to claim 15, wherein there are about 0.7 to 2.0 succinic anhydride units per polyisobutylene moiety used in said reaction.

19. The lactone modified adduct according to claim 15, wherein there are about 1.0 to 1.5 succinic anhydride units per polyisobutylene moiety used in said reaction.

20. The lactone modified adduct according to claim 17, wherein there are about 0.7 to 2.0 succinic anhydride units per polyisobutylene moiety used in said reaction.

21. The lactone modified adduct according to claim 17, wherein there are about 1.0 to 1.5 succinic anhydride units per polyisobutylene moiety used in said reaction.

22. The lactone modified adduct according to claim 9, wherein there are about 0.7 to 2.0 succinic anhydride units per polyisobutylene moiety used in said reaction.

23. The lactone modified adduct according to claim 9, wherein there are about 1.0 to 1.5 succinic anhydride units per polyisobutylene moiety used in said reaction.

24. An oleaginous composition comprising an oleaginous lubricating oil and a poly lactone modified adduct material prepared by first reacting a non-heterocyclic polyamine with a hydrocarbyl substituted $C_4$-$C_{10}$ dicarboxylic acid producing material to form a neutralized reaction product having at least one reactive amino group, then reacting said neutralized reaction product with a non-polymerizable lactone selected from the group consisting of lactones and thiolactones having up to four carbon atoms in the lactone ring to form an intermediate adduct, and then, in a separate step, reacting said intermediate adduct with a $C_5$-$C_9$ polymerizable lactone at a temperature of from about 30° to about 200° C. for a period sufficient to effect ring opening polymerization of said $C_5$-$C_9$ lactone, said hydrocarbyl substituted $C_4$-$C_{10}$ dicarboxylic acid producing material being formed by reacting an olefin polymer of a $C_2$-$C_{10}$ monolefin of 700 to about 5,000 $M_n$ with a $C_4$-$C_{10}$ monounsaturated dicarboxylic acid material, wherein there is an average of from about 0.7 to about 2.0 dicarboxylic acid producing moieties per molecule of said olefin polymer used in the reaction, and wherein said lactone modified adduct material contains the unit

where m represents the average degree of polymerization and is a number having an average value of from 0.2 to about 100 and q is 4 to 8, said lactone modified adduct material being useful as an oil additive.

25. The oleaginous composition according to claim 24, wherein said non-polymerizable lactone is butyrolactone and said polymerizable lactone is E-caprolactone.

26. A lubricating oil composition comprising lubricating oil and about 0.01 to 15 wt. % of the lactone modified adduct material of claim 1.

27. A lubricating oil comprising a major amount of lubricating oil and about 0.1 to 10 wt. % of the lactone modified adduct material of claim 3.

28. A lubricating oil comprising a major amount of lubricating oil and about 0.1 to 10 wt. % of the lactone modified adduct material according to claim 4.

29. A lubricating oil comprising a major amount of lubricating oil and about 0.1 to 10 wt. % of the lactone modified adduct material according to claim 10.

30. A lubricating oil comprising a major amount of lubricating oil and about 0.1 to 7 wt. % of the lactone modified adduct material according to claim 10.

31. A lubricating oil comprising a major amount of lubricating oil and about 0.1 to 7 wt. % of the lactone modified adduct material according to claim 11.

32. A lubricating oil comprising a major amount of lubricating oil and about 0.1 to 10 wt. % of the lactone modified adduct material according to claim 17.

33. An oil composition containing 0.01 to 15 wt. %, based on the weight of the total composition, of a lactone modified adduct material according to claim 1.

34. An oil composition containing 0.01 to 15 wt. %, based on the weight of the total composition, of a lactone modified adduct material according to claim 4.

35. An oil composition containing 0.01 to 15 wt. %, based on the weight of the total composition, of a lactone modified adduct material according to claim 9.

36. An oil soluble dispersant useful as an oil additive, comprising the product of a reaction mixture comprising (I) and (II), which product is further reacted, in a separate step, with (III), wherein
   (I) is the reaction product of (a) a hydrocarbyl substituted $C_4$ to $C_{10}$ monounsaturated dicarboxylic acid producing material formed by reacting olefin polymer of $C_2$ to $C_{10}$ monoolefin having a molecular weight of about 700 to 5,000 and a $C_4$ to $C_{10}$ monounsaturated acid material, wherein there are 0.7 to 2.0 dicarboxylic acid producing moieties per molecule of said olefin polymer in the reaction mixture, and (b) a non-heterocyclic polyamine; and wherein
   (II) is a non-polymerizable lactone selected from the group consisting of lactones and thiolactones having up to four carbon atoms in the lactone ring; and wherein
   (III) is a polymerizable $C_5$-$C_9$ lactone, wherein there are, on the average, from about 0.2 to about 100 $C_5$-$C_9$ lactone derived moieties per unit of said reaction product (I) used in the reaction and wherein said $C_5$-$C_9$ lactone is reacted at a temperature of from about 30° to about 200° C. for a period sufficient to effect ring opening polymerization of said $C_5$-$C_9$ lactone.

37. An oil soluble dispersant according to claim 36, wherein said non-polymerizable lactone is butyrolactone, said polymerizable $C_5$-$C_9$ lactone is caprolactone, and said dispersant contains the unit

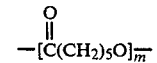

wherein m is from 0.2 to about 100.

38. An oil soluble dispersant according to claim 36, wherein said polyamine is selected from the group consisting of polyamines of about 2 to 60 total carbon atoms and about 2 to 12 nitrogen atoms in the molecule.

39. An oil soluble dispersant according to claim 38, wherein m is 0.5 to 20, and said polyamine is an aliphatic saturated amine having the general formula

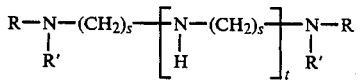

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6; and t is a number of from 0 to 10, with the proviso that when $t=0$, at least one of R or R' must be H such that there are at least two of either primary or secondary amino groups.

40. An oil soluble dispersant according to claim 38, wherein said polyamine is selected from the group consisting of 1,2-diaminoethane; 1,3-diaminopropane; 1,4-diaminobutane; 1,6-diaminohexane; diethylene triamine; triethylene tetramine; tetraethylene pentamine; 1,2-propylene diamine; di-(1,2-propylene)triamine; di-(1,3propylene triamine; N,N-dimethyl-1,3-diaminopropane; N,N-di-(2-aminoethyl) ethylene diamine; and N-dodecyl-1,3-propane diamine.

41. The oil soluble dispersant according to claim 37, wherein said polyamine is a mixture of poly (ethyleneamines) averaging about 5 to about 7 nitrogen atoms per molecule.

42. An oil soluble reaction product useful as an oil additive comprising:
(a) polymer consisting essentially of $C_2$ to $C_{10}$ monoolefin, said polymer being of about 700 to 5,000 molecular weight and substituted with succinic moieties selected from the group consisting of acid, anhydride and ester groups, wherein there are about 0.7 to 2.0 molar proportions of succinic moieties per molar proportion of said polymer,
(b) non-heterocyclic polyamine containing 2 to 60 carbon atoms and 2 to 12 nitrogen groups, and
(c) non-polymerizable lactone selected from the group consisting of lactones and thiolactones having up to four carbon atoms in the lactone ring, and
(d) polymerizable $C_5$–$C_9$ lactone, wherein
(a) is first reacted with (b), and the reaction product of (a) and (b) is then reacted with (c), and then the resulting reaction product of (a), (b) and (c) is reacted with (d) at a temperature of from about 30° to about 200° C. for a period sufficient to effect ring opening polymerization of said $C_5$–$C_{b\ 9}$ lactone, and wherein there are, on the average, about 0.2 to 100 polar proportions of (d) per molar proportion of said reaction product.

43. The oil soluble reaction product according to claim 42, wherein (b) is an aliphatic saturated amine having the general formula

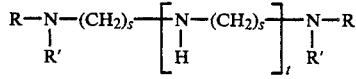

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6, and t is a number of from 0 to 10, with the provision that when $t=0$, at least one of R or R' must be H such that there are at least two of either primary or secondary amino groups.

44. The oil soluble reaction product according to Claim 42, wherein (b) is selected from the group consisting of 1,2-diaminoethane; 1,3-diaminopropane; 1,4-diaminobutane; 1,6-diaminohexane; diethylene triamine; triethylene tetramine; tetraethylene pentamine; 1,2-propylene diamine; di-(1,2-propylene)triamine; di-(1,3-propylene triamine; N,N-dimethyl-1,3-diaminopropane; N,N-di-(2-aminoethyl) ethylene diamine; and N-dodecyl-1,3-propane diamine.

45. The oil soluble reaction product according to claim 42, wherein (b) is a mixture of poly(ethyleneamines) averaging about 5 to about 7 nitrogen atoms per molecule.

46. The oil soluble reaction product according to claim 42, wherein (a) is polyisobutylene of about 700 to 3,000 molecular weight substituted with succinic anhydride moieties.

47. The oil soluble reaction product according to claim 42, wherein (c) is butyrolactone.

48. The oil soluble reaction product according to claim 42, wherein (d) is E-caprolactone and wherein there are about 0.5 to 20 molar proportions of (c) per molar proportion of said reaction product.

49. The oil soluble reaction product according to claim 47, wherein (d) is E-caprolactone and wherein there are about 0.5 to 20 molar proportions of (c) per molar proportion of said reaction product.

50. The oil soluble reaction product according to claim 49, wherein (a) is a polyisobutylene of about 900 to about 2,500 molecular weight substituted with succinic anhydride moieties.

51. The oil soluble reaction product according to claim 49, wherein (b) is an aliphatic saturated amine having the general formula

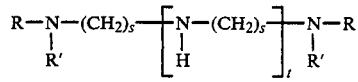

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6, and t is a number of from 0 to 10, with the provision that when $t=0$, at least one of R or R' is H such that there are at least two of either primary or secondary amino groups.

52. The oil soluble reaction product according to claim 51, wherein (b) is selected from the groups consisting of 1,2-diaminoethane; 1,3-diaminopropane; 1,4-diaminobutane; 1,6-diaminohexane; diethylene triamine; triethylene tetramine; tetraethylene pentamine; 1,2-propylene diamine; di-(1,2-propylene)triamine; di-(1,3-propylene triamine; N,N-dimethyl-1,3-diaminopropane; N,N-di-(2-aminoethyl) ethylene diamine; and N-dodecyl-1,3-propane diamine.

53. The oil soluble reaction product according to claim 49, wherein (b) is a mixture of poly(ethyleneamines) averaging about 5 to about 7 nitrogen atoms per molecule.

54. An oleaginous composition comprising an oleaginous lubricating oil and an oil soluble dispersant comprising the oil soluble reaction product of a reaction mixture comprising:

(a) at least one aminated hydrocarbyl substituted $C_4$ to $C_{10}$ monounsaturated dicarboxylic acid producing material formed by first reacting an olefin polymer of $C_2$ to $C_{10}$ monoolefin having a molecular weight of about 700 to 5,000 with a $C_4$ to $C_{10}$ monounsaturated dicarboxylic acid material, wherein there are 0.7 to 2.0 dicarboxylic acid producing moieties per molecule of said olefin polymer used in the reaction, and then with a non-heterocyclic polyamine; and (b) at least one non-polymerizable lactone selected from the group consisting of lactones and thiolactones having up to four carbon atoms in the lactone ring; and (c) at least one polymerizable $C_5$–$C_9$ lactone, wherein there are 0.2–100 molar proportions of reactant (c) per molar proportion of reactant (a) in said reaction product, wherein said reactant (a) is first reacted with reactant (b), and wherein the intermediate reaction product of reactants (a) and (b) is used to initiate ring opening polymerization of said reactant (c) at a temperature of from about 30° to about 200° C.

55. The oleaginous composition according to claim 54, wherein said reactant (b) is butyrolactone, wherein reactant (c) is E-caprolactone and wherein said reaction product of reactants (a), (b) and (c) contains the unit

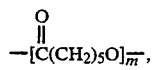

where m is 0.5 to 20.

56. The oleaginous composition according to claim 54, wherein said polyamine is an aliphatic saturated amine having the general formula

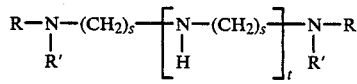

R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals, each s is the same or a different number of from 2 to 6, and t is a number of from 0 to 10, with the provision that when t=0, at least one of R and R' is H such that there are at least two primary or secondary amino groups present in said polyamine.

57. The oleaginous composition according to claim 54, wherein said polyamine is a mixture of poly(ethyleneamines) averaging about 5 to about 7 nitrogen atoms per molecule.

58. A lubricating oil composition comprising lubricating oil and oil soluble reaction product useful as an oil additive, said reaction product being the product of reaction of:

(a) polymer of $C_2$ to $C_{10}$ monoolefin of 700 to 5,000 molecular weight substituted with succinic moieties selected from the group consisting of acid, anhydride and ester groups, wherein there are about 0.7 to 2.0 molar proportions of succinic moieties per molar proportion of said polymer, and (b) non-heterocyclic polyamine containing 2 to 60 carbon atoms and 2 to 12 nitrogen groups, further reacted with (c) non-polymerizable lactone selected from the group consisting of lactones and thiolactones having up to four carbon atoms in the lactone ring, and still further reacted with (d) polymerizable $C_5$–$C_9$ lactone, wherein there are 0.2 to 100 molar proportions of polymerizable lactone per molar proportion of the product obtained by the reaction of (a) with (b) in said oil soluble reaction product, and wherein (a) if first reacted with (b) to form an intermediate product which is then reacted with (c) to form a second intermediate product which is then reacted with (d) at a temperature of from about 30° to about 200° for a period sufficient to effect ring opening polymerization of said $C_5$–$C_9$ lactone.

59. The lubricating oil composition according to claim 58, wherein (c) is butyrolactone, wherein (d) is caprolactone, and wherein there are 0.5 to 20 molar proportions of caprolactone per molar proportion of product obtained by the reaction of (a) with (b) in said oil soluble reaction product.

60. The lubricating oil composition according to claim 59, wherein said amine is an aliphatic saturated amine having the general formula

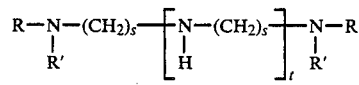

wherein R and R' independently are selected from the group consisting of hydrogen, $C_1$ to $C_{25}$ straight or branched chain alkyl radicals, $C_1$ to $C_{12}$ alkoxy $C_2$ to $C_6$ alkylene radicals, and $C_1$ to $C_{12}$ alkylamino $C_2$ to $C_6$ alkylene radicals; each s is the same or a different number of from 2 to 6; and t is a number of from 0 to 10, with the provision that when t=0, at least one of R and R' is H such that there are at least two primary or secondary amino groups present in said amine.

61. The lubricating oil composition according to claim 59, wherein said amine is a mixture of poly(ethyleneamines) averaging about 5 to about 7 nitrogen atoms per molecule.

62. The lubricating oil composition according to claim 58, wherein (a) is polyisobutylene of about 700 to 3,000 molecular weight substituted with succinic anhydride moieties.

63. The lubricating oil composition according to claim 60, wherein (a) is polyisobutylene of about 700 to 3,000 molecular weight substituted with succinic anhydride moieties.

64. A lubricating crankcase motor oil composition for automotive vehicles and trucks comprising a major amount of lubricating oil; from about 0.01 to 15 wt. % of a dispersant formed by reacting a polyolefin substituted with polyamine, then with a non-polymerizable lactone selected from the group consisting of lactones and thiolactones having up to four carbon atoms in the lactone ring, and then with a polymerizable $C_5$–$C_9$ lactone at a temperature of from about 30° to about 200° for a period sufficient to effect ring opening polymerization of said $C_5$–$C_9$ lactone, wherein said substituted succinic acid or anhydride has about 0.7 to 2.0 molar proportions of succinic moieties per molar proportion of polyolefin, wherein said polyolefin is a polymer of $C_2$ to $C_{10}$ monoolefin having a molecular weight of about 700 to 5,000, and wherein said dispersant has about 0.2 to 100 molar proportions of polymerizable lactone moieties per molar proportion of polyolefin; and an effective amount of a viscosity modifier.

65. The composition according to claim 64, wherein said dispersant is the reaction product of polyisobutene reacted with maleic anhydride, then with a polyamine, and then with butyrolactone.

66. The composition according to claim 65, wherein said composition also contains an effective amount of an anti-wear agent.

67. An additive concentrate comprising about 20 to 80 wt. % lubricating oil and about 20 to 80 wt. % of a dispersant which is a lactone modified adduct formed by reacting at a temperature of from about 30° to about 200° C., on the average, 0.2 to 100 molar proportions of (I) polymerizable $C_5$–$C_9$ lactone per molar proportion of (II) nonpolymerizable lactone modified, amine neutralized, hydrocarbyl substituted, $C_4$ to $C_{10}$ monounsaturated dicarboxylic acid producing material which, in turn, has been formed by first reacting (a) non-heterocyclic polyamine with the reaction product of (b) olefin polymer of $C_2$ to $C_{10}$ monoolefin having a molecular weight of about 700 to 5,000 and (c) $C_4$ to $C_{10}$ monounsaturated dicarboxylic acid material, wherein there are an average of 0.7 to 2.0 dicarboxylic acid producing moieties per molecule of said olefin polymer used in the reaction, and then reacting the resulting reaction product with (d) non-polymerizable lactone, said nonpolymerizable lactone being selected from the group consisting of lactones and thiolactones having up to four carbon atoms in the lactone ring.

68. The concentrate according to claim 67, wherein (b) is polyisobutylene, (c) is maleic anhydride, (d) is butyrolactone, and (I) is caprolactone, and wherein said dispersant is formed by reacting said polyisobutylene with said maleic anhydride, then reacting the polyisobutylene-maleic anhydride reaction product with said polyamine, then with said butyrolactone, and then with said caprolactone.

69. The concentrate according to claim 68, which also contains an effective amount of a viscosity modifier.

70. The concentrate according to claim 69, which also contains an effective amount of an antiwear agent.

71. An additive concentrate comprising about 20 to 80 wt. % lubricating oil and about 20 to 80 wt. % of an oil soluble caprolactone adduct of a hydrocarbyl substituted $C_4$ to $C_{10}$ monounsaturated dicarboxylic acid producing material which has been reacted with a non-heterocyclic polyamine and with a non-polymerizable lactone selected from the group consisting of lactones and thiolactones having up to four carbon atoms in the lactone ring prior to being reacted with caprolactone at a temperature of about 30° to about 200° C. for a period of time sufficient to effect ring opening polymerization of said caprolactone, said adduct being useful as an improved dispersant, said hydrocarbyl substituted material being formed by reacting an olefin polymer of a $C_2$ to $C_{10}$ monoolefin having a molecular weight of about 700 to 5,000 and a $C_4$ to $C_{10}$ saturated dicarboxylic acid or anhydride, wherein there are 0.7 to 2.0 dicarboxylic acid producing moieties per molecule of said olefin polymer used in the reaction, and said adduct containing, on the average, from 0.5 to 20 caprolactone moieties per molecule of said olefin polymer present in said adduct.

72. An additive concentrate according to claim 71, wherein said $C_4$ to $C_{10}$ acid producing material is polyisobutylene substituted with 0.7 to 2.0 moles of succinic anhydride units per mole of polyisobutylene.

73. An additive concentrate according to claim 72, which also contains an effective amount of a viscosity modifier.

74. An additive concentrate according to claim 73, which also contains an anti-wear effective amount of a zinc dihydrocarbyl dithiophosphate.

* * * * *